United States Patent
Takeda et al.

(10) Patent No.: US 8,567,044 B2
(45) Date of Patent: Oct. 29, 2013

(54) METHOD OF MANUFACTURING A MAGNETIC DISK

(75) Inventors: Hiroshi Takeda, Tokyo (JP); Ken-ichi Nishimori, Tokyo (JP); Tomotaka Yokoyama, Tokyo (JP); Tadashi Tomonaga, Tokyo (JP)

(73) Assignees: Hoya Corporation, Tokyo (JP); Hoya Glass Disk (thailand) Ltd., Lamphun (TH)

( * ) Notice: Subject to any disclaimer, the term of this patent is extended or adjusted under 35 U.S.C. 154(b) by 79 days.

(21) Appl. No.: 13/223,060

(22) Filed: Aug. 31, 2011

(65) Prior Publication Data
US 2011/0308073 A1 Dec. 22, 2011

Related U.S. Application Data

(62) Division of application No. 12/014,398, filed on Jan. 15, 2008, now Pat. No. 8,033,008.

(30) Foreign Application Priority Data

Jan. 17, 2007 (JP) .................................. 2007-8531
Dec. 20, 2007 (JP) ................................ 2007-328631

(51) Int. Cl.
*G11B 5/127* (2006.01)
*H04R 31/00* (2006.01)

(52) U.S. Cl.
USPC ................. 29/603.03; 29/603.04; 29/603.07; 360/31; 360/53; 360/135

(58) Field of Classification Search
USPC .................... 29/593, 603.03, 603.04, 603.06, 29/603.09; 360/31, 53, 135
See application file for complete search history.

(56) References Cited

U.S. PATENT DOCUMENTS

| | | | |
|---|---|---|---|
| 4,437,180 A | | 3/1984 | Takeuchi |
| 5,146,571 A | * | 9/1992 | Logan .......................... 714/6.13 |
| 5,541,903 A | | 7/1996 | Funahashi et al. |
| 5,844,883 A | * | 12/1998 | Kanno et al. ............... 369/53.29 |

(Continued)

FOREIGN PATENT DOCUMENTS

| JP | 2002-260222 A | 9/2002 |
|---|---|---|
| JP | 2007-157311 A | 6/2007 |
| JP | 2007-226862 A | 9/2007 |

OTHER PUBLICATIONS

Singapore Search and Examination Report corresponding to Singapore Patent Application No. 200800436-8, mailed Sep. 18, 2010.

*Primary Examiner* — Paul D Kim
(74) *Attorney, Agent, or Firm* — Sughrue Mion, PLLC

(57) ABSTRACT

A defect inspection is performed for each of glass substrates by a surface defect detector. The distance from the center of the glass substrate to a detected defect, as a radius of a nonmagnetic region to be formed circular, is recorded along with an ID assigned to the glass substrate. Such defect information is recorded in a defect list using a printer or recorded in an RFID tag using an RFID writer. The defect list or the RFID tag is attached to a glass-substrate case. Each glass substrate and its defect information are in one-to-one correspondence and are provided to a customer as a magnetic disk manufacturer. Based on the obtained defect information, the customer manufactures magnetic disks each being a discrete track recording medium having the nonmagnetic region formed at the position where the defect is present.

2 Claims, 9 Drawing Sheets

(56) References Cited

U.S. PATENT DOCUMENTS

| | | |
|---|---|---|
| 6,055,139 A | 4/2000 | Ohtsuka et al. |
| 6,819,218 B2 | 11/2004 | Mabuchi et al. |
| 6,864,042 B1 * | 3/2005 | Kuo et al. ............ 430/320 |
| 6,888,918 B2 | 5/2005 | Horai et al. |
| 7,738,205 B2 * | 6/2010 | Maeno et al. ............ 360/53 |
| 2002/0159174 A1 | 10/2002 | Hashi et al. |
| 2003/0003457 A1 * | 1/2003 | Golovlev ............ 435/6 |
| 2003/0031878 A1 | 2/2003 | Mitani et al. |
| 2005/0226110 A1 | 10/2005 | Suzuki et al. |
| 2006/0121317 A1 | 6/2006 | Kokaku et al. |
| 2006/0132912 A1 * | 6/2006 | Haese et al. ............ 359/457 |

* cited by examiner

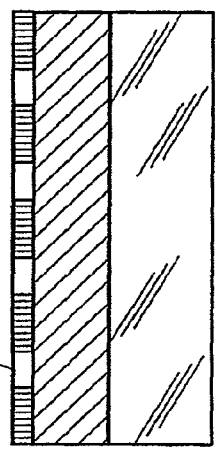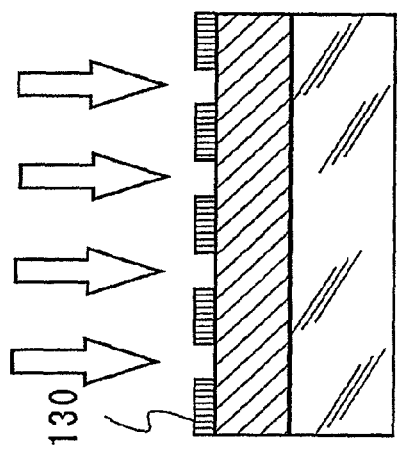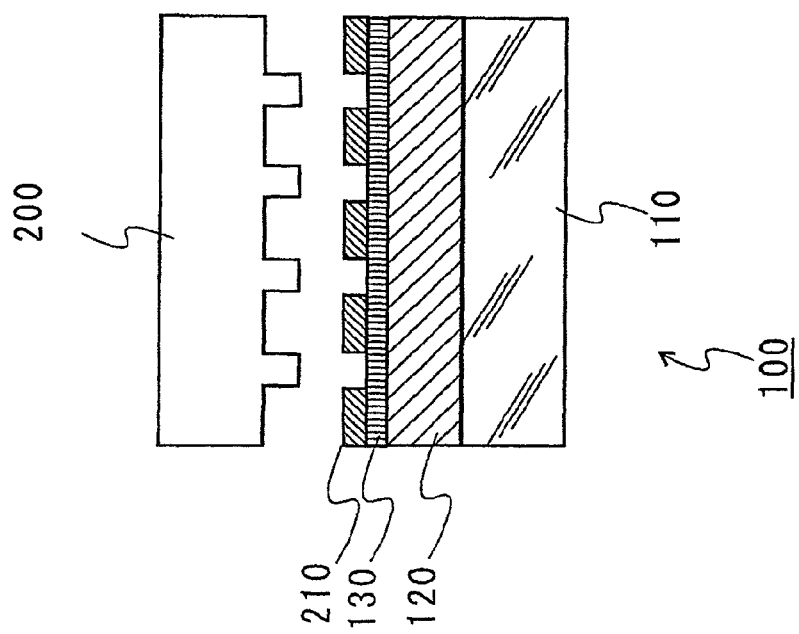

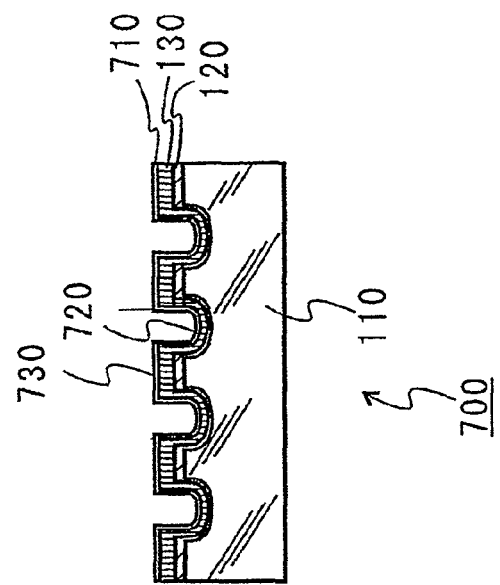
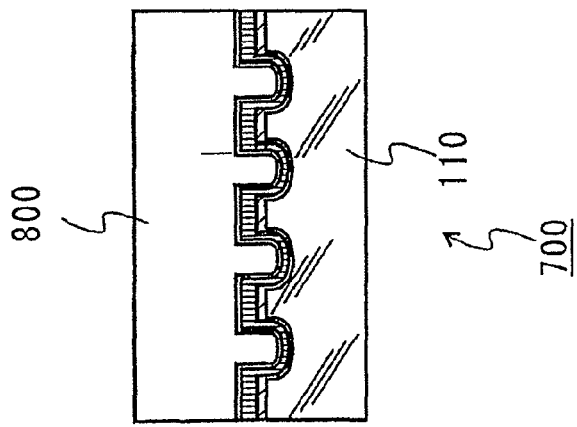
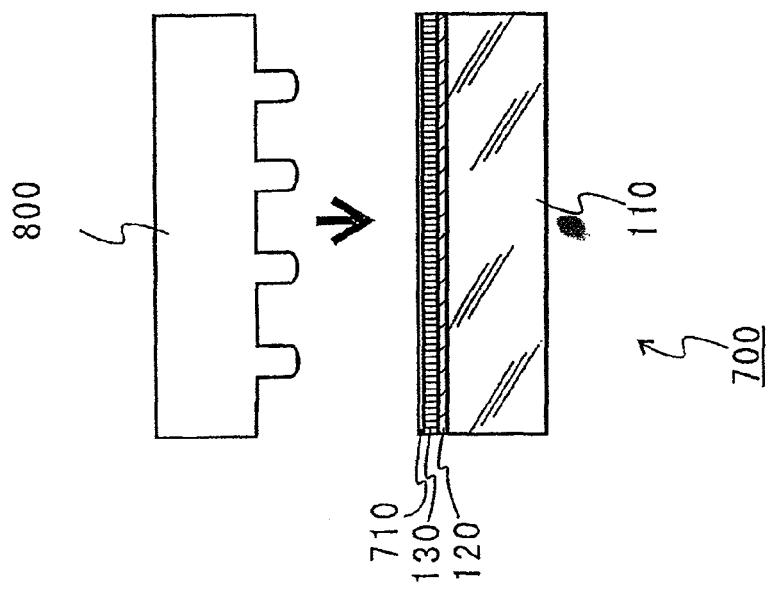
FIG. 8C
FIG. 8B
FIG. 8A

METHOD OF MANUFACTURING A MAGNETIC DISK

This is a Divisional of application Ser. No. 12/014,398 filed Jan. 15, 2008, claiming priority based on Japanese patent application No. 2007-8531, filed on Jan. 17, 2007, and Japanese patent application No. 2007-328631, filed on Dec. 20, 2007, the disclosures of which are incorporated herein in their entirety by reference.

BACKGROUND OF THE INVENTION

This invention relates to a method for supporting the manufacture of a magnetic disk which is a discrete track recording medium using a disk-shaped glass substrate and having nonmagnetic regions between tracks formed in a magnetic layer and adapted to record information thereon, and further relates to a method of manufacturing such a magnetic disk.

Aluminum substrates have been widely used as substrates for magnetic recording media. However, following the reduction in size and thickness and the increase in recording density of magnetic disks, there has been an increasing demand for glass substrates that are excellent in substrate surface flatness and substrate strength as compared with the aluminum substrates.

In recent years, following the development of information technology such as the spread of broadband communications and the start of digital broadcasting, there has been an increasing necessity for storing and using a large amount of data. Particularly, for magnetic disks such as hard disks excellent in cost performance, a new technique for further increasing the recording density has been required for satisfying a request that the disk is small enough to be mounted even in a portable device such as a portable telephone or a video camera and, simultaneously, is large in capacity.

Conventionally, in order to increase the recording density of a magnetic disk, use has been made of a technique of reducing the width of a magnetic head and narrowing spaces between data tracks where information is to be recorded, thereby achieving an increase in recording density. However, it has become difficult to ignore a magnetic influence and a thermal fluctuation phenomenon between the adjacent tracks.

Under the circumstances, there has recently been proposed a new type medium called a discrete track recording medium (hereinafter abbreviated as a "DTR medium") in which data tracks are formed so as to be magnetically isolated from each other (see, e.g. "Development of Ultrahigh-Density Hard Disk Magnetic Recording Medium", [online], TDK Corporation, [searched Dec. 10, 2006], Internet <URL: http://www.business-i.jp/sentan/jusyou/2006/tdk.pdf>).

The DTR medium is intended for improving the signal quality by removing a magnetic material (grooving process) at portions unnecessary for recording by the use of the newest nanotechnologies such as electron-beam lithography and nanoimprint lithography. Further, after the grooving process, grooves are filled with a nonmagnetic material so as to realize the angstrom-level surface flatness required for magnetic disk drives. The DTR medium has drastically increased the recording density of media to open the way to practical use of ultrasmall-sized large-capacity magnetic disks.

Further, there has also been proposed a new type medium called a patterned medium (a medium adapted to record a signal as a dot pattern) which has been developed from the DTR medium by further increasing the recording density (see, e.g. "Development of Ultrahigh-Density Hard Disk Magnetic Recording Medium" referred to above). This is also a recording medium in the form of a magnetic recording medium for use as a hard disk or the like, in which magnetic particles are regularly arranged artificially.

In addition, there are also a DTR medium in which magnetic tracks are magnetically isolated from each other by pressing a stamper with convex portions onto a flat magnetic layer to form groove portions between the magnetic tracks (see, e.g. Japanese Unexamined Patent Application Publication (JP-A) No. 2007-157311) and a DTR medium having a demagnetized layer formed by ion irradiation (see, e.g. Japanese Unexamined Patent Application Publication (JP-A) No. 2007-226862).

SUMMARY OF THE INVENTION

However, following the increase in recording density of a magnetic disk, the flying height of a magnetic head has decreased to a value of about 10 nm or less. Accordingly, the surface of a glass substrate for laminating a magnetic layer thereon is also required to be still smoother. Thus, the glass substrate is judged defective even with a slight defect. Therefore, the yield of glass substrates tends to be worsened. Magnetic-disk glass substrates judged defective are discarded.

As a result of assiduous studies, the present inventors have found that when manufacturing a DTR medium, there are nonmagnetic regions where no information is to be recorded, and therefore, if such a nonmagnetic region is formed at a portion where a defect of a glass substrate is present, there is no influence to information writing/reading. The present inventors have further found that, by shipping to a magnetic disk manufacturer a glass substrate mapped with its surface defect information, the manufacturer intentionally forms a nonmagnetic region at a region where the defect is present, and uses other regions for recording tracks. As a consequence, even the glass substrate with the defect can be used as the glass substrate of a DTR medium without discarding it. Based on this knowledge, the present inventors have completed this invention.

In other words, the present inventors have found that, by shipping to the manufacturer a magnetic-disk glass substrate mapped with its defect information necessary for manufacturing a DTR medium, the DTR medium can be manufactured from the magnetic-disk glass substrate that could not otherwise be used as being defective in the conventional recording system, and have reached the completion of this invention.

It is therefore an object of this invention to provide a magnetic disk manufacturing support method and a magnetic disk manufacturing method that can enhance customer satisfaction of a DTR media manufacturer and improve the yield of magnetic-disk glass substrates by providing glass substrate defect information to the DTR media manufacturer.

In order to solve above-mentioned object, according to an aspect of this invention, there is provided a method for supporting manufacture of a magnetic disk as a discrete track recording medium having a nonmagnetic region between tracks formed in a magnetic layer and adapted to record information thereon, the method comprising the steps of:

detecting a defect present on a main surface of a disk-shaped glass substrate and producing defect information including a distance from a center of the glass substrate to the defect; and shipping the glass substrate along with the defect information as information for forming the nonmagnetic region to at least one of a place of manufacturing the magnetic disk using the glass substrate and a place of manufacturing a magnetic-disk storage device using the magnetic disk.

According to the above aspect, in the step of forming the magnetic layer and the nonmagnetic region on the glass substrate, it is possible to provide the nonmagnetic region at the position where the defect of the glass substrate is present. Therefore, even a glass substrate with a defect can be used as a substrate of a DTR medium. Thus, the yield of glass substrates is improved. Further, a magnetic disk manufacturer can use yield-improved low-priced glass substrates and manufacture magnetic disks with no problem in terms of magnetic recording. Therefore, the customer satisfaction is improved.

The defect information may be produced by using a defect detector.

The glass substrate may be shipped while attaching an information recording medium recorded with the defect information to a container storing the glass substrate. This is because the position of the defect cannot be marked on the glass substrate itself.

Further, the information recording medium may be an RFID (Radio Frequency Identification) tag. With this structure, there is an advantage in that the defect information of the glass substrate can be obtained by non-contact reading.

According to another aspect of this invention, there is provided a method of manufacturing a magnetic disk as a discrete track recording medium having a nonmagnetic region between tracks formed in a magnetic layer and adapted to record information thereon, the method comprising the steps of:

detecting a defect present on a main surface of a disk-shaped glass substrate and producing defect information including a distance from a center of the glass substrate to the defect;

forming the magnetic layer on the main surface of the glass substrate; and providing the nonmagnetic region in the magnetic layer based on the defect information.

According to the above aspect, the yield of glass substrates is improved and the customer satisfaction is improved as described before.

Further, according to other aspect of this invention, there is provided a method for supporting manufacture of a magnetic disk as a discrete type medium in which magnetic dots where information is to be recorded are arranged so as to be separated by a nonmagnetic region, the method comprising the steps of:

detecting a defect present on a main surface of a disk-shaped glass substrate and producing defect information including coordinates of the defect; and shipping the glass substrate along with the defect information as a position of the nonmagnetic region to at least one of a place of manufacturing the magnetic disk using the glass substrate and a place of manufacturing a magnetic-disk storage device using the magnetic disk.

According to the above aspect, with respect to a magnetic-disk glass substrate being a discrete type medium in which magnetic dots where information is to be recorded are arranged so as to be separated by a nonmagnetic region in an optional manner, the yield is improved and the customer satisfaction is improved.

Moreover, according to other aspect of this invention, there is provided a method for supporting manufacture of a magnetic disk as a discrete track recording medium having, between tracks formed in a magnetic layer and adapted to record information thereon, a non-recording region serving to magnetically isolate the tracks from each other, the method comprising the steps of:

detecting a defect present on a main surface of a disk-shaped glass substrate and producing defect information including a position of the defect; and shipping the glass substrate along with the defect information as information for forming the non-recording region to at least one of a place of manufacturing the magnetic disk using the glass substrate and a place of manufacturing a magnetic-disk storage device using the magnetic disk.

According to the above aspect, the non-recording region is not necessarily formed of a nonmagnetic material as long as it can magnetically isolate the tracks from each other.

The non-recording region may be a groove portion between the tracks. This is because even if the non-recording region includes the magnetic layer, it is possible to magnetically isolate the tracks from each other by adopting the form of such a groove portion.

The non-recording region may be formed simultaneously with the tracks by pressing a stamper with a convex portion onto the magnetic layer. According to such a method, the DTR medium can be manufactured without performing a complicated process such as dry etching.

The non-recording region may be a nonmagnetic region and the nonmagnetic region may be formed of a nonmagnetic alloy containing Si. This aims to magnetically isolate the tracks from each other by a nonmagnetic material, not by a physical shape such as a groove.

The nonmagnetic region may be formed by ion irradiation. According to such a method, the nonmagnetic region can be formed more easily as compared with other methods such as dry etching.

The position of the defect may be specified by a distance from a center of the glass substrate to the defect or by orthogonal coordinates or polar coordinates of the defect.

The defect information may be produced by using a defect detector.

Preferably, a width of the defect in a radial direction of the glass substrate is smaller than a width of the non-recording region. This is because when the non-recording region is provided at the position where the defect of the glass substrate is present, the defect does not protrude from the non-recording region.

According to this invention, by shipping to a magnetic disk manufacturer a glass substrate for a magnetic disk being a discrete type medium along with defect information about the surface of the glass substrate, it is possible to use the magnetic-disk glass substrate that would not otherwise be used as being defective in the case of manufacturing a conventional magnetic disk including no nonmagnetic region. This is because if a nonmagnetic region is provided at a position where a defect occurs, information can be recorded without any problem on information recording tracks or magnetic dots.

Consequently, the yield of glass substrates is improved and thus it is possible to reduce the unit cost thereof. Further, a glass substrate manufacturer can improve customer satisfaction of a magnetic disk manufacturer as a customer.

BRIEF DESCRIPTION OF THE DRAWINGS

FIGS. 2A through 2C are diagrams showing the method of manufacturing the magnetic disk as a DTR medium shown in FIG. 1;

FIGS. 8A through 8C are diagrams showing a method of manufacturing a magnetic disk as another DTR medium.

DESCRIPTION OF THE EXEMPLARY EMBODIMENTS

Now, referring to the accompanying drawings, a description will be given in detail of embodiments of a magnetic disk manufacturing support method and system and a magnetic disk manufacturing method and system according to this invention. In the figures, illustration of components not directly related to this invention is omitted and the same components are denoted by the same reference symbols.

A glass substrate for a magnetic disk is formed through a plurality of processes. Then, after the completion of the glass substrate, a defect inspection process for inspecting the presence of a defect of the substrate surface, a defect information recording process, a packing process, and a shipping process are carried out. Hereinbelow, in order to facilitate understanding of the embodiments of this invention, a description will be given in detail of a magnetic disk structure, a magnetic disk manufacturing method, a defect inspection process, a defect information recording process, a packing process, and a shipping process.

(Magnetic Disk Structure)

Figure 1:
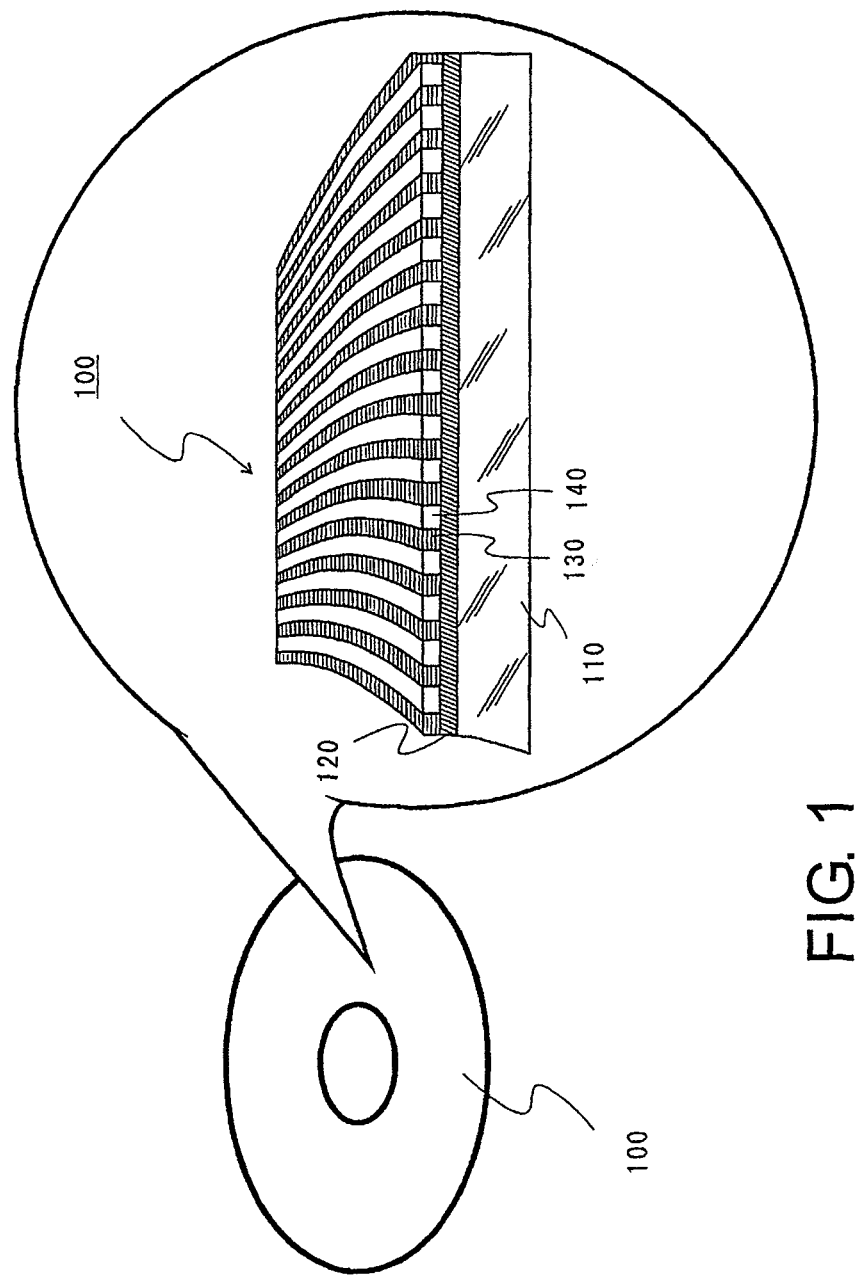
FIG. 1 is a structural diagram of a magnetic disk finally manufactured by an embodiment of a magnetic disk manufacturing support method and system and a magnetic disk manufacturing method and system according to this invention.

FIG. 1 is a structural diagram of a magnetic disk finally manufactured by an embodiment of a magnetic disk manufacturing support method and system and a magnetic disk manufacturing method and system according to this invention.

As shown in FIG. 1, a magnetic disk 100 is a discrete track recording medium (hereinafter abbreviated as a "DTR medium"). Referring to its enlarged sectional view, a soft magnetic layer 120 is formed on a glass substrate 110. On the soft magnetic layer 120, there are further formed a plurality of tracks 130 in a magnetic layer that are used for recording information thereon and nonmagnetic regions 140, where no information is to be recorded, between the tracks 130. The track pitch is typically about 200 nm.

(Magnetic Disk Manufacturing Method)

FIGS. 2A through 2C are diagrams showing the method of manufacturing the magnetic disk 100 as the DTR medium shown in FIG. 1. As shown in FIG. 2A, a stamper 200 serving as a master plate is first produced by electron-beam lithography. The stamper 200 is formed with patterns of servo information, data tracks, and so on. Using the produced stamper 200, the patterns are transferred onto a resist resin 210 on the medium by nanoimprint lithography. Then, as shown in FIG. 2B, using the transferred resin patterns as a mask, grooves are formed on the medium surface by dry etching. Then, as shown in FIG. 2C, a nonmagnetic material 140 is buried in the once-formed grooves for carrying out surface flattening in order to ensure the flying stability of a magnetic head. Then, a protective film and a lubricating film are formed thereon.

Since no information is to be recorded at the positions where the nonmagnetic regions 140 are formed, the magnetic head does not perform a read/write operation at those positions. Therefore, it is a feature of the embodiment according to this invention to clarify in advance the position of a defect such as a projection or a depression of the glass substrate 110 by an inspection and to provide the nonmagnetic region 140 at the position where such a defect is present, thereby eliminating an obstacle to reading/writing of information with respect to the magnetic disk 100.

In FIGS. 1 and 2, the nonmagnetic material 140 is buried between the data tracks. However, it is sufficient that the data tracks be magnetically isolated from each other by non-recording regions where no information is to be recorded. Therefore, the nonmagnetic material is not necessarily buried between the data tracks.

FIGS. 8A through 8C are diagrams showing a method of manufacturing a magnetic disk 700 as another DTR medium. As shown in FIG. 8A, a soft magnetic layer 120, a magnetic layer 130, and a protective layer 710 are first formed on a glass substrate 110 by sputtering. Then, by pressing a stamper 800 with convex portions onto the layers 120, 130, 710 as shown in FIG. 8B, there are formed a plurality of tracks 730 and, simultaneously, non-recording regions 720 between them as shown in FIG. 8C. Finally, a lubricating layer of perfluoropolyether (not shown) is formed on the surface thereof.

According to this method, the magnetic disk 700 can be manufactured without performing a complicated process such as dry etching.

The non-recording regions 720 formed by the method of FIGS. 8A through 8C are in the form of groove portions between the tracks 730. Since the non-recording regions 720 are simply pressed by the stamper 800, the magnetic layer 130 is included at the surface thereof. However, by adopting the form of such groove portions, it is possible to magnetically isolate the tracks 730 from each other. The stamper 800 is formed in advance as having a negative pattern of such groove portions and may have rounded tip portions in cross-section as shown in FIG. 8A instead of rectangular tip portions in cross-section.

In the case of the magnetic disk 700, the concave portions remain on the medium surface, but it is preferable that the depth thereof, i.e. the difference in height between the highest and lowest positions thereof, be set to 100 nm or less. This is for ensuring the flying stability of a magnetic head.

Figure 9:
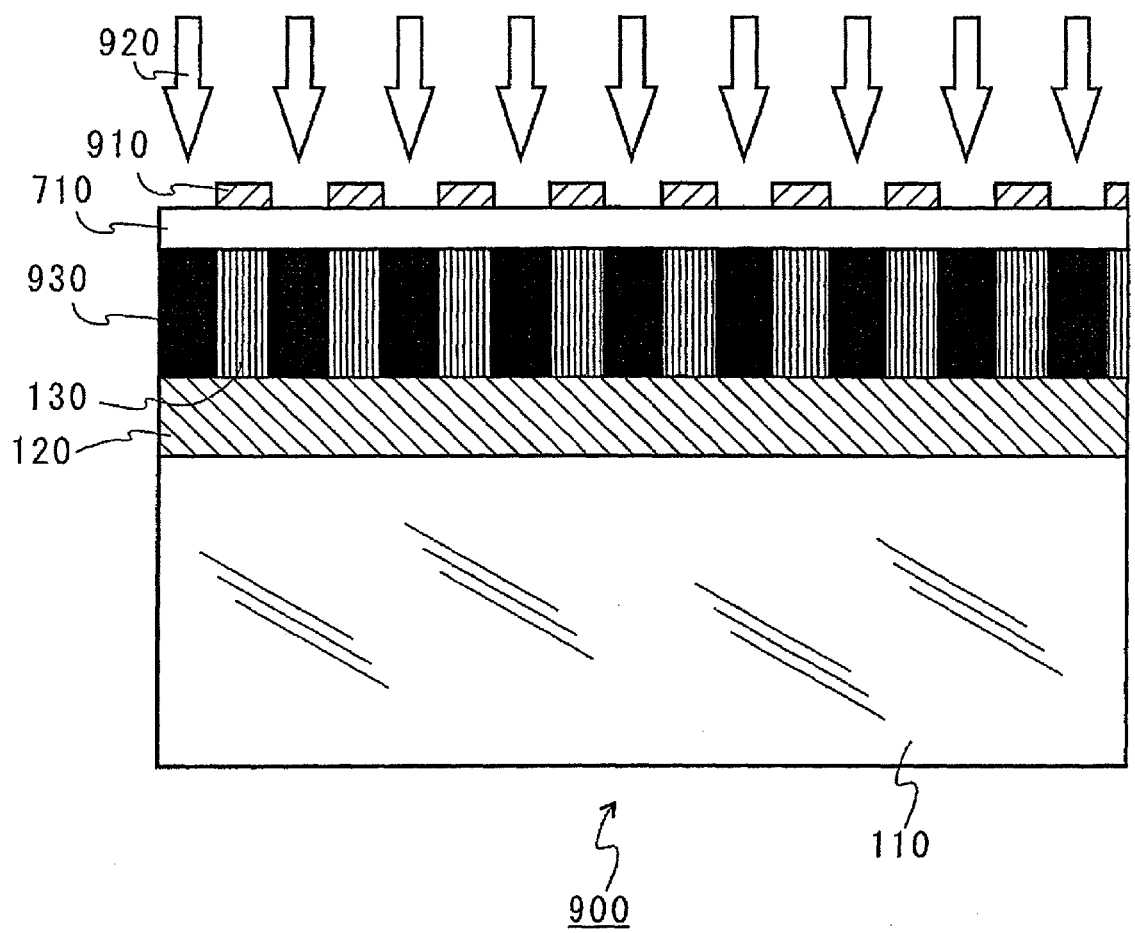
FIG. 9 is a diagram showing a method of manufacturing a magnetic disk as still another DTR medium.

FIG. 9 is a diagram showing a method of manufacturing a magnetic disk 900 as still another DTR medium. The magnetic disk 900 comprises a soft magnetic layer 120, a magnetic layer 130, and a protective layer 710 on the surface of a glass substrate 110. Further, a non-illustrated lubricating layer is formed on the protective layer 710.

In this embodiment, the magnetic layer 130 is demagnetized in a pattern by performing ion irradiation 920 through a mask 910 having a pattern for magnetically isolating portions of the magnetic layer 130 from each other.

The mask 910 formed into a predetermined pattern beforehand is set to be perpendicular to the ion irradiation 920 and parallel to the magnetic disk 900. As a material of the mask 910, use may be made of a material such as a quartz, soda-lime glass, or Si wafer that can block ions and can be formed into a predetermined pattern.

After setting the mask 910, ions capable of demagnetizing the magnetic layer 130 are implanted. In this embodiment, Si is used. In this manner, nonmagnetic regions 930 made of a nonmagnetic alloy containing Si are formed. As mentioned above, the tracks are magnetically isolated from each other by the nonmagnetic material in this embodiment, not by the physical shape such as the grooves between the tracks. The lubricating layer is coated after the ion irradiation. In this manner, the magnetic disk 900 is manufactured.

The ion irradiation (ion implantation) may be carried out using an ion implanter. In, B, P, C, F, or the like may be used as implantation ions other than Si and there is no particular limitation to their kinds and combinations as long as demagnetization is achieved by ion implantation.

According to the ion irradiation as described above, the nonmagnetic regions can be formed more easily as compared with other methods such as dry etching.

(Defect Inspection Process)

Figure 3:
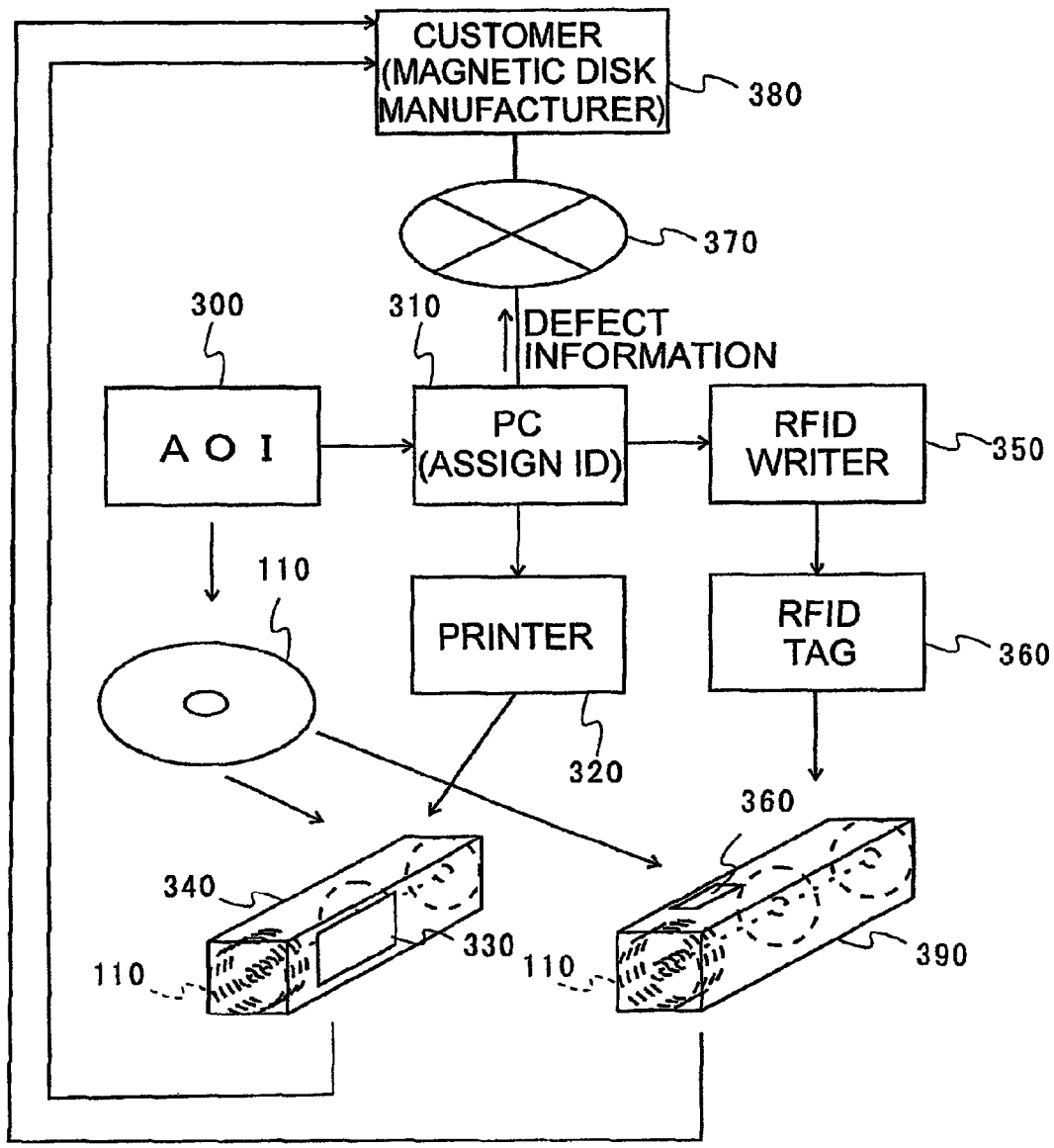
FIG. 3 is a flow diagram showing a process of inspecting a defect of a glass substrate of the magnetic disk of FIG. 1 in the embodiment of the magnetic disk manufacturing support method and system according to this invention.

FIG. 3 is a flow diagram showing a process of inspecting a defect of the glass substrate of the magnetic disk of FIG. 1 in the embodiment of the magnetic disk manufacturing support method and system according to this invention. The completed glass substrate 110 is subjected to a defect inspection by a surface defect detector (AOI: Automatic Optical Inspection) 300. As a result, it is possible to form a map of defects occurring in the glass substrate.

Defect information may include position, type (projection, depression, adherend), and size of a defect on the glass substrate. More specifically, the position of a defect on the disk-shaped glass substrate 110 is specified by a distance from the center of the glass substrate 110 to the defect present on the main surface thereof.

Figure 4:
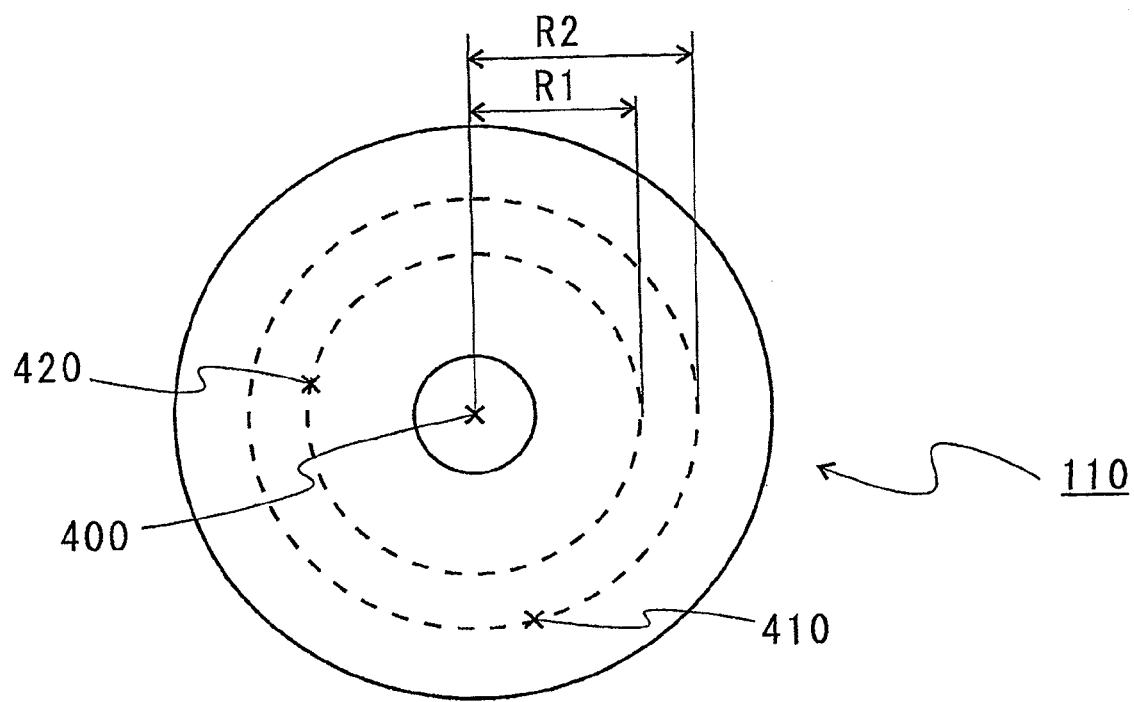
FIG. 4 is a diagram showing the positions of defects in defect information obtained by an AOI shown in FIG. 3.

FIG. 4 is a diagram showing the positions of defects in the defect information obtained by the AOI 300 shown in FIG. 3. Since the defect map is clarified by the AOI 300, coordinates of each defect can also be known. However, in this embodiment, it is determined to provide a circular nonmagnetic region concentric to the glass substrate 110 and passing through the position of the defect. Therefore, such detailed information as the coordinates of each defect is not necessary, but it is sufficient to record the defects as the radii of circles including the defects, i.e. like distances R1 and R2 from the center 400 of the glass substrate 110 to defects 420 and 410, respectively, shown in FIG. 4.

However, the position of a defect is not limited to the foregoing radius and may, naturally, be specified by another information and included in defect information. For example, the position of a defect may be specified by any method such as orthogonal coordinates (X, Y), polar coordinates (r, θ), or the like as long as the position of the defect can be clarified.

Further, defects may be ranked according to the sizes thereof. For example, defects may be ranked per 10 nm of the maximum diameters thereof, while, defects each being large enough to exceed the width of the nonmagnetic region 140 affect the tracks 130 even if the nonmagnetic regions 140 are provided, and thus may be ranked the same as representing such a meaning.

Particularly, it is preferable that the width of a defect in the radial direction of the glass substrate 110 be smaller than that of the non-recording region 720 (the nonmagnetic region 140, 930 is also a kind of non-recording region in the sense that no information is to be recorded). This is because when the non-recording region 140, 720, 930 is provided at the position where the defect of the glass substrate 110 is present, the defect does not protrude from the non-recording region.

(Defect Information Recording Process)

As shown in FIG. 3, defect information of each glass substrate 110 obtained by the AOI 300 is transferred to a personal computer (hereinafter abbreviated as a "PC") 310 connected to the AOI 300 and is assigned an ID by the PC 310. The defect information and the ID are in one-to-one correspondence with each other. A defect list 330 mapping between the defect information and the IDs can be printed by a printer 320. In this event, the same IDs are also assigned to the glass substrates 110 by the PC 310. Each ID may include a number of a case where the corresponding glass substrate is to be stored, and a storage position of the corresponding glass substrate in the case.

(Packing Process)

Figure 5:
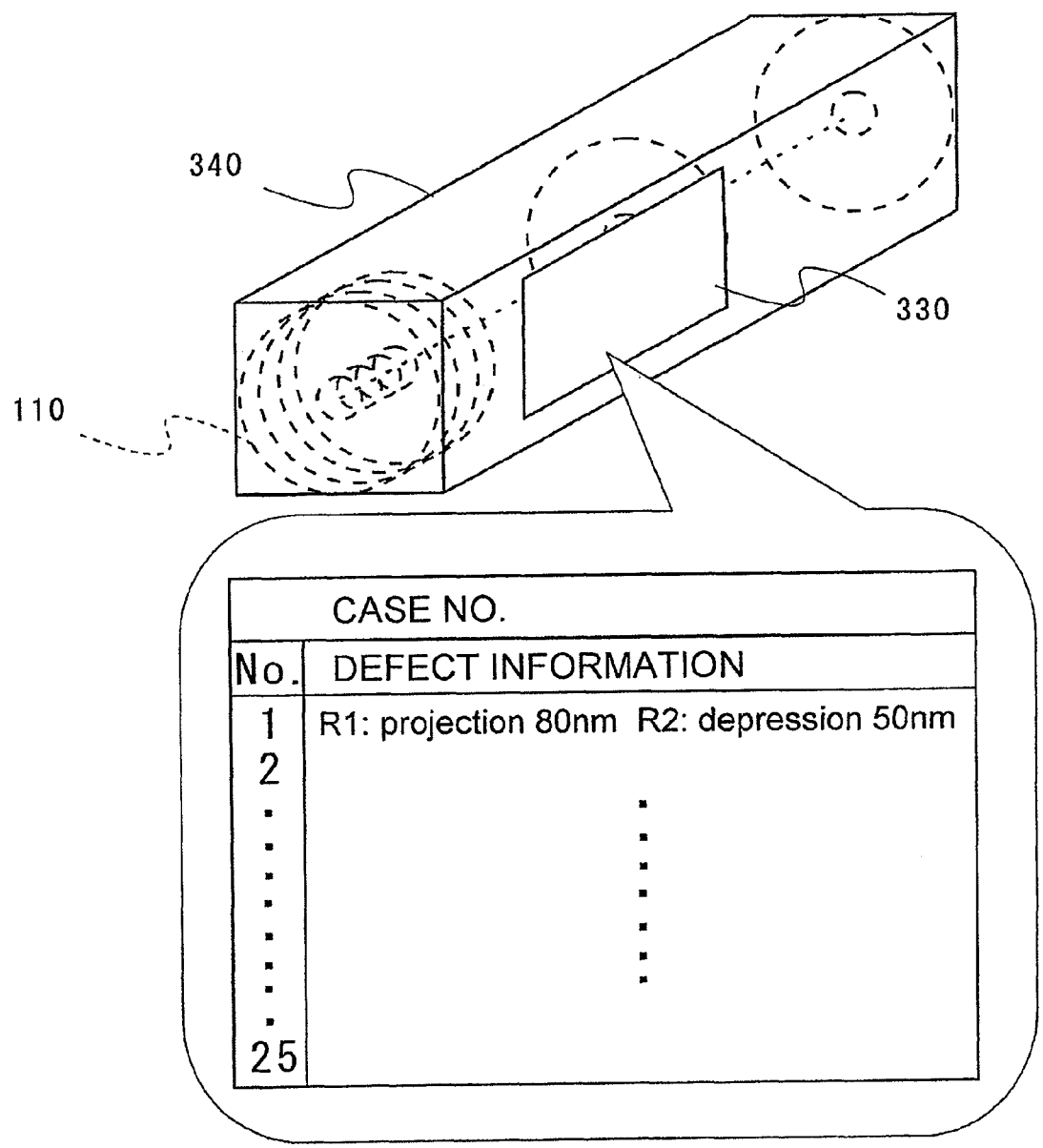
FIG. 5 is an enlarged view of a plastic glass-substrate case, shown in FIG. 3, having a shape of a substantially rectangular parallelepiped and serving as a container for storing glass substrates.

FIG. 5 is an enlarged view of a plastic glass-substrate case 340, shown in FIG. 3, having a shape of a substantially rectangular parallelepiped and serving as a container for storing the glass substrates 110. The glass substrates 110 are stored in the case 340 as described in the defect list 330. The case 340 can accommodate 25 glass substrates and defect information of all the glass substrates is described in the defect list 330. However, information of the glass substrate with no defect may be excluded from the defect list 330.

As shown in FIG. 5, the defect list 330 printed by the printer 320 is attached to the glass-substrate case 340. Although it is ideal to mark a defect map on each glass substrate 110 itself, since such a marking is impossible, the defect information is attached to the glass-substrate case 340 serving as the accommodation container. As shown in FIG. 5, the foregoing IDs are shown in the defect list 330. Specifically, there are described a case number assigned to the case 340 where the glass substrates 110 are stored, and a number representing a storage position of each glass substrate 110 in the 25 glass substrates.

In this manner, the case 340 accommodating the glass substrates 110 is attached with the printed defect list 330 being an information recording medium recorded with the radii of nonmagnetic regions 140 to be formed circular.

Since the glass-substrate case 340 is further vacuum-packed, the defect list being the information recording medium or a later-described RFID tag may be attached after the vacuum packing.

(Defect Information Recording Process)

Figure 6:
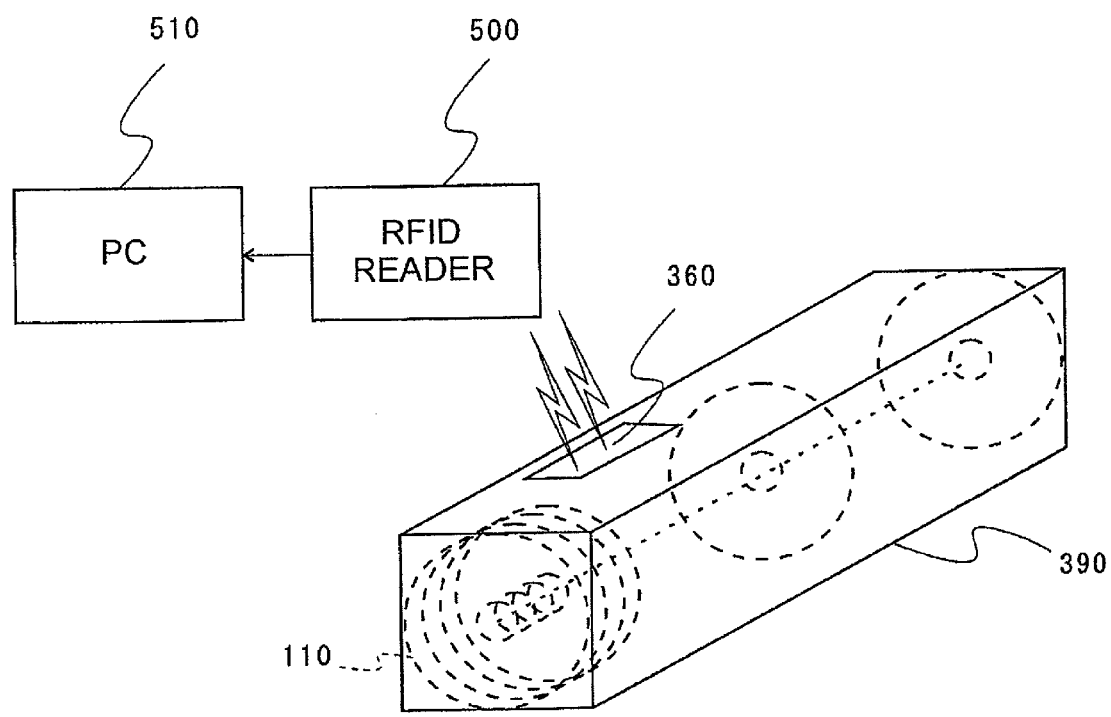
FIG. 6 is an enlarged view of the glass-substrate case shown in FIG. 3.

On the other hand, the defect information and the IDs may be transferred to an RFID (Radio Frequency Identification) writer 350 from the PC 310 and the RFID writer 350 may write the contents thereof into an RFID tag 360. FIG. 6 is an enlarged view of a glass-substrate case 390 shown in FIG. 3. As shown in FIG. 6, by reading the RFID tag 360 using an RFID reader 500 in a non-contact manner at a delivery destination of the glass-substrate case 390, it is possible to notify the delivery destination which of the glass substrates stored in the case 390 have what defects.

In this manner, the information recording medium recorded with the distances (radii of nonmagnetic regions) where defects are present may be the RFID tag 360 attached to the glass-substrate case 390.

Further, the ID/defect information may be directly transmitted to a customer 380 being the delivery destination of the glass substrates 110 from the PC 310 through a wide area network such as the Internet. In this case, since a glass-substrate case accommodating the glass substrates 110 as the actual articles is not attached with the defect information, it is necessary to make arrangements beforehand for ensuring correspondence between the transmitted ID/defect information and the delivered glass substrates 110 by some method.

For example, use may be made of a method that gives a shape representing the IDs to a glass-substrate case accommodating the glass substrates 110.

(Shipping Process)

As described above, it is the customer 380 that is provided with the defect information. As shown in FIG. 3, the customer 380 is a place where magnetic disks are manufactured using the glass substrates, i.e. a magnetic disk manufacturer. That is, the glass substrates 110 and the distances (radii of nonmagnetic regions) recorded in correspondence to the glass substrates 110 are provided in advance to the customer 380 that performs a process of forming a magnetic layer and nonmagnetic regions on each glass substrate 110.

The customer 380 forms a magnetic layer 130 on the main surface of the glass substrate 110 and further forms, in the formed magnetic layer 130, circular nonmagnetic regions 140 having the radii included in the defect information. Specifically, the nonmagnetic regions 140 are provided at the positions where defects are present. The method of forming the magnetic layer 130 and further forming the nonmagnetic regions 140 is as described before with reference to FIG. 2.

Even if defect information is provided to the magnetic disk manufacturing process as described above, it does not necessarily follow that a glass substrate with a defect is always used as a substrate of a magnetic disk. However, while glass substrates with defects are all discarded conventionally, there is a case where a glass substrate even with a defect can be used upon manufacturing a DTR medium. Therefore, the yield is improved.

As described before, defects may be ranked in advance based on the sizes thereof and the ranks may be recorded as defect information instead of the sizes of the defects. According to this, since the defect of the rank higher than a predetermined rank exceeds the width of the nonmagnetic region 140, the influence exerted on the tracks cannot be avoided. Thus, it is possible to quickly judge that such a glass substrate should be discarded.

(Discrete Type Medium)

A magnetic disk being a discrete type medium may be used as an embodiment of this invention. The discrete type medium is a more popularized form of the foregoing DTR medium and, in this specification, is defined as a medium in which magnetic dots where information is to be recorded are arranged so as to be separated by nonmagnetic regions where no information is to be recorded. In this case, a magnetic disk manufacturing support method preferably includes a process of detecting coordinates of a defect present on the main surface of a disk-shaped glass substrate and a process of shipping the glass substrate along with defect information including the detected coordinates as a position of a nonmagnetic region of the glass substrate to a place of manufacturing a magnetic disk using the glass substrate and/or a place of manufacturing a magnetic disk storage device using a magnetic disk.

According to the above structure, the customer can manufacture a magnetic disk in which a nonmagnetic region is formed at the coordinates where the defect is present and magnetic dots are arranged in other regions on the main surface of the magnetic-disk glass substrate.

Accordingly, with respect to a magnetic-disk glass substrate being a discrete type medium in which magnetic dots where information is to be recorded are arranged so as to be separated by nonmagnetic regions in an optional manner, the yield is improved and thus the customer satisfaction is improved.

(Patterned Medium)

Further, a patterned medium may be used as an embodiment of this invention. The patterned medium can be considered as a kind of the foregoing discrete type medium. That is, the patterned medium is a medium in which magnetic dots separated by nonmagnetic regions are arranged in a predetermined pattern and one-bit information is recorded per magnetic dot. The predetermined pattern may be any pattern such as, for example, a lattice pattern or a honeycomb pattern that can arrange magnetic dots discretely. Further, the shape of each dot may be optional according to the predetermined pattern, such as circular, rectangular, square, rhombic, or the like.

(Magnetic Disk Manufacturing Support System)

Further, as another embodiment of this invention, it is also possible to provide a system for supporting the manufacture of a magnetic disk being a discrete track recording medium having nonmagnetic regions, where no information is to be recorded, between tracks formed in a magnetic layer and adapted to record information thereon, wherein the system comprises defect detection means for detecting a defect present on the main surface of a disk-shaped glass substrate and producing defect information including a distance from the center of the glass substrate to the defect, and means for shipping the glass substrate along with the defect information as information for forming the nonmagnetic region to a place of manufacturing the magnetic disk using the glass substrate and/or a place of manufacturing a magnetic-disk storage device using the magnetic disk.

EXAMPLE 1

In this example, magnetic-disk glass substrates and magnetic disks were manufactured through the following processes. Particularly, the magnetic disk manufacturing support method and system according to the embodiment were applied to (8) Magnetic Disk Manufacturing Support Process.

(1) Shaping Process and First Lapping Process

At first, molten aluminosilicate glass was formed into a disk shape by direct pressing using upper, lower, and drum molds, thereby obtaining an amorphous plate-like glass. As the aluminosilicate glass, glass for chemical strengthening was used. Other than the direct pressing, a disk-shaped magnetic-disk glass substrate may be obtained by cutting it out, using a grindstone, from a sheet glass formed by a fusion method, a downdraw method, or a float method. As the aluminosilicate glass, use was made of a glass for chemical strengthening which contains, as main components, 58 to 75 wt % $SiO_2$, 5 to 23 wt % $Al_2O_3$, 3 to 10 wt % $Li_2O$, and 4 to 13 wt % $Na_2O$. A soda-lime glass or the like can be used instead of the aluminosilicate glass.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive grains. Specifically, the lapping was carried out by pressing lapping surface plates onto the main surfaces of the plate-like glass from the upper and lower sides, supplying a grinding fluid containing the free abrasive grains onto the main surfaces of the plate-like glass, and relatively moving the plate-like glass and the surface plates to each other. By this lapping, the glass base member having the flat main surfaces was obtained.

(2) Cutting-Out Process (Coring, Forming)

Then, the glass base member was cut using a diamond cutter, thereby cutting out disk-shaped glass substrates from the glass base member. Then, using a cylindrical diamond drill, a circular hole was formed at a center portion of each glass substrate, thereby obtaining doughnut-shaped glass substrates (coring). Then, grinding was applied to an inner peripheral end face and an outer peripheral end face of each glass substrate using diamond grindstones, thereby carrying out predetermined chamfering of the end faces (forming).

(3) Second Lapping Process

Then, lapping was applied to both main surfaces of each of the obtained glass substrates in the same manner as in the first lapping process. By performing this second lapping process, fine irregularities formed on the main surfaces in the cutting-out process or an end face polishing process as a previous process can be removed in advance. Consequently, it becomes possible to complete a subsequent main surface polishing process in a short time.

(4) End Face Polishing Process

Then, the end faces of the glass substrates were mirror-polished by a brush polishing method. In this event, as polishing abrasive grains, use was made of a slurry (free abrasive grains) containing cerium oxide abrasive grains. By this end face polishing process, the end faces of the glass substrates were finished to a mirror surface state that can prevent the generation of dust such as particles.

(5) Main Surface Polishing Process

A first polishing process was first carried out as a main surface polishing process. This first polishing process mainly aims to remove cracks or strains remaining on the main surfaces during the foregoing lapping processes. In this first polishing process, the main surfaces were polished using a double-side polishing machine having a planetary gear mechanism with the use of a hard resin polisher. Cerium oxide abrasive grains were used as a polishing fluid.

The glass substrates subjected to the first polishing process were immersed in respective cleaning baths of neutral detergent, pure water, and IPA (isopropyl alcohol) in turn so as to be cleaned.

Subsequently, a second polishing process was carried out as a main surface polishing process. This second polishing process aims to finish the main surfaces into mirror surfaces. In this second polishing process, the main surfaces were mirror-polished using a double-side polishing machine having a planetary gear mechanism with the use of a soft resin foam polisher. As a polishing fluid, use was made of cerium oxide abrasive grains finer than the cerium oxide abrasive grains used in the first polishing process.

The glass substrates subjected to the second polishing process were immersed in respective cleaning baths of neutral detergent, pure water, and IPA (isopropyl alcohol) in turn so as to be cleaned. An ultrasonic wave was applied to each cleaning bath.

(6) Chemical Strengthening Process

Then, chemical strengthening was applied to the glass substrates subjected to the foregoing lapping and polishing processes. By performing this chemical strengthening process, it is possible to generate high compressive stresses at surface layer portions of each glass substrate and thus to improve the impact resistance thereof.

(7) Precise Cleaning Process

Next, precise cleaning of the glass substrates subjected to the chemical strengthening process was carried out. This is for removing the remnants of the abrasives, iron-based contaminants of foreign origin, and so on that would otherwise cause failures such as head crash and thermal asperity, thereby obtaining the glass substrates with the smooth and clean surfaces. In this precise cleaning process, water rinsing and IPA cleaning were carried out after cleaning with an alkaline aqueous solution.

(8) Magnetic Disk Manufacturing Support Process

Figure 7:
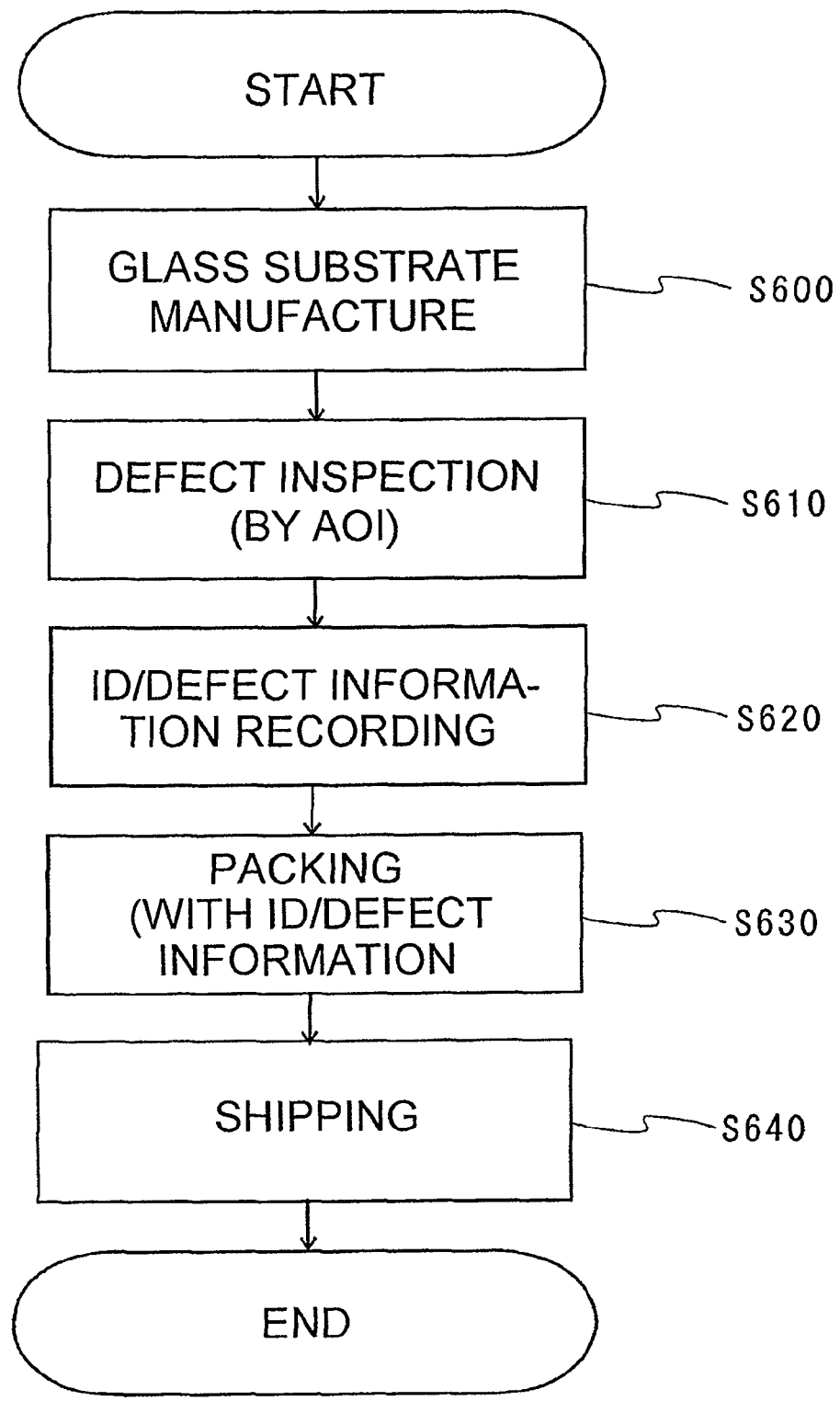
FIG. 7 is a flowchart of an embodiment of a magnetic disk manufacturing support process according to this invention which inspects defects of completed glass substrates and provides defect information to a magnetic disk manufacturing process.

FIG. 7 is a flowchart of a magnetic disk manufacturing support process that inspects defects of the completed glass substrates and provides defect information to a magnetic disk manufacturing process.

The foregoing processes (1) to (7) correspond to a glass substrate manufacturing process (step S600) in FIG. 7. Thereafter, a defect inspection process (step S610) using the AOI 300 was carried out. By this, defect information, i.e. the position, type (projection, depression, adherend), and size of a defect, of each glass substrate 110 is obtained. In the embodiment of this invention, the position of a defect is specified by a distance from the center of the disk-shaped glass substrate 110 to the defect present on the main surface thereof, which represents a radius of a nonmagnetic region 140 to be formed circular.

However, the position of a defect is not limited to the foregoing radius and may, naturally, be specified by another information and included in defect information. For example, the position of a defect may be specified by any method such as orthogonal coordinates (X, Y), polar coordinates (r, θ), or the like as long as the position of the defect can be clarified.

After the defect information was obtained, an ID was assigned to the defect information and the corresponding glass substrate. Each ID included a number of a case where the corresponding glass substrate is to be stored, and a storage position of the corresponding glass substrate in the case. The ID and the defect information were in one-to-one correspondence with each other and were recorded on an information recording medium, i.e. a sheet of paper by the printer 320 or an RFID tag by the RFID writer 350 (step S620).

The glass substrates were packed in a glass-substrate case, serving as a glass-substrate accommodating container, that was attached with the ID/defect information recorded on the information recording medium as described above (step S630), and then were shipped in the state where the radial positions, sizes (ranks), and types of defects and the corresponding glass substrates were fully clarified (step S640).

(9) Magnetic Disk Manufacturing Process

On each of both main surfaces of each of the glass substrates obtained through the foregoing processes, an adhesive layer of a Cr alloy, a soft magnetic layer of a CoTaZr-group alloy, an underlayer of Ru, a perpendicular magnetic recording layer of a CoCrPt-group alloy, a protective layer of hydrogenated carbon, and a lubricating layer of perfluoropolyether were formed in this order. In this manner, perpendicular magnetic recording disks were manufactured. This structure is one example of the structure of a perpendicular magnetic disk. Magnetic layers and so on may be formed as an in-plane magnetic disk.

As shown in FIG. 2A, a stamper 200 serving as a master plate was first produced by electron-beam lithography. The stamper 200 was formed with patterns of servo information, data tracks, and so on. Using the produced stamper 200, the patterns were transferred onto a resist resin 210 on the medium by nanoimprint lithography. Then, as shown in FIG. 2B, using the transferred resin patterns as a mask, grooves were formed on the medium surface by dry etching. Subsequently, as shown in FIG. 2C, a nonmagnetic material 140 was buried in the once-formed grooves for carrying out surface flattening in order to ensure the flying stability of a magnetic head. Thereafter, a protective film and a lubricating film were formed thereon. Upon forming the above patterns, the positions of forming the patterns were determined using the foregoing ID/defect information.

In addition, a magnetic disk 700 as a DTR medium was also manufactured by the method of pressing a stamper 800 with convex portions onto layers 120, 130, 710 as shown in FIG. 8B, to thereby form a plurality of tracks 730 and, simultaneously, non-recording regions 720 between them as shown in FIG. 8C. In this event, the positions of pressing the stamper 800 were adjusted using the foregoing ID/defect information so that the groove portions as the non-recording regions 720 were formed at the positions of defects.

Further, as shown in FIG. 9, a magnetic disk 900 as a DTR medium was also manufactured by the method of demagnetizing a magnetic layer 130 in a pattern by performing ion irradiation 920 through a mask 910 having a pattern for magnetically isolating portions of the magnetic layer 130 from each other. Also in this event, using the foregoing ID/defect information, the mask 910 was set in a manner to expose the positions of defects so that nonmagnetic regions 930 were formed at the positions of the defects.

With respect to the obtained magnetic disks, it was confirmed that there was no occurrence of defect on the films such as the magnetic layers due to foreign matter. A glide test was performed and there was observed no hit (a head grazes a projection on the surface of a magnetic disk) or crash (a head collides with a projection on the surface of a magnetic disk). Further, a reproduction test was performed using a magnetoresistive head and there was observed no malfunction in reproduction due to thermal asperity.

Consequently, even a glass substrate with a defect that has hitherto been discarded in advance by a substrate manufacturer can be used as a substrate of a DTR medium based on a judgment of a magnetic disk manufacturer as a customer. Further, since the yield of glass substrates is improved by this, the unit cost thereof is reduced, thus making it possible to contribute to an improvement in customer satisfaction.

While the preferred embodiments of this invention have been described with reference to the accompanying drawings, it is needless to say that this invention is not limited thereto. It is obvious that an expert in the art can make various changes or modifications within the scope of claims and it is readily understood that those changes or modifications also belong to the technical scope of this invention.

This invention is applicable to a method and system for supporting the manufacture of a magnetic disk which is a discrete track recording medium using a disk-shaped glass substrate and having nonmagnetic regions, where no information is to be recorded, between tracks formed in a magnetic layer and adapted to record information thereon, and is further applicable to a method and system for manufacturing such a magnetic disk.

What is claimed is:

1. A method of manufacturing a magnetic disk as a discrete track recording medium having tracks formed in a magnetic layer and adapted to record information thereon ,and a non-magnetic region formed between the tracks and adapted to record no information thereon,
   the method comprising the steps of:
   detecting a defect present on a main surface of a disk-shaped glass substrate and producing defect information including a distance from a center of the glass substrate to the defect;
   forming the magnetic layer on the main surface of the glass substrate; and
   providing the nonmagnetic region in the magnetic layer based on the defect information.

2. The method according to claim 1, wherein the nonmagnetic region is a circular region concentric to the glass substrate and passing through a position of the defect.

\* \* \* \* \*